United States Patent [19]

Graas

[11] Patent Number: 5,337,815
[45] Date of Patent: Aug. 16, 1994

[54] PNEUMATIC TIRE HAVING IMPROVED WET TRACTION

[75] Inventor: Maurice Graas, Reichlange, Luxembourg

[73] Assignee: The Goodyear Tire & Rubber Company, Akron, Ohio

[21] Appl. No.: 955,954

[22] Filed: Oct. 5, 1992

[51] Int. Cl.$^5$ .............................................. B60C 11/04
[52] U.S. Cl. .................... 152/209 R; D12/146
[58] Field of Search ............... 152/209 R, 209 D; D12/146-151

[56] References Cited

U.S. PATENT DOCUMENTS

| | | | |
|---|---|---|---|
| D. 312,993 | 12/1990 | Guermandi et al. | |
| D. 324,840 | 3/1992 | Maxwell et al. | D12/147 |
| D. 328,444 | 8/1992 | Graas | |
| D. 329,032 | 9/1992 | Maxwell et al. | |
| D. 329,627 | 9/1992 | Attinello et al. | |
| D. 335,115 | 4/1993 | Suzuki | |
| D. 336,273 | 6/1993 | Kohara et al. | D12/147 |

FOREIGN PATENT DOCUMENTS

| | | |
|---|---|---|
| 296605A | 6/1987 | European Pat. Off. |
| 0296605 | 12/1988 | European Pat. Off. ........ 152/209 R |
| 3723368 | 7/1987 | Fed. Rep. of Germany |
| 0819836 | 10/1937 | France ............................ 152/209 R |
| 0166708 | 7/1986 | Japan .............................. 152/209 R |
| 0357419 | 11/1930 | United Kingdom ........... 152/209 R |
| 2221877 | 2/1990 | United Kingdom ........... 150/209 R |

OTHER PUBLICATIONS

1991 Tread Design Guide, p. 35, p. 55.
Design Application 07/951,705, filed Sep. 28, 1992.

*Primary Examiner*—Michael W. Ball
*Assistant Examiner*—Nancy T. Krawczyk
*Attorney, Agent, or Firm*—David E. Wheeler

[57] ABSTRACT

A directional pneumatic tire having improved wet traction has an annular aqua channel and lateral grooves which direct water from the footprint to the shoulder area of the tire to help prevent hydroplaning. The aqua channel has an extended U-shape wherein a wall of the aqua channel closer to a shoulder of the tire has a steeper incline than the side of the aqua channel closer to the center of the tire. The aqua channel may have a step between its shoulder side and its center side wherein the center side is higher by a distance d. In one illustrated embodiment, a center tread portion of the tire, bounded by an aqua channel and a center groove, and two lateral grooves, comprises a single block element.

6 Claims, 4 Drawing Sheets

PNEUMATIC TIRE HAVING IMPROVED WET TRACTION

BACKGROUND OF THE INVENTION

The invention relates to pneumatic tires which have improved wet traction and handling characteristics.

Hydroplaning of tires on wet pavement has long been a problem in the prior art. Hydroplaning is caused by a tire when running on wet pavement, because the tire pushes water in front of it as it advances, until the back pressure of the water is sufficient to lift the tire off the road. The pressure of the water is a function of the depth of the water and the speed of the tire. Various tire designs, adapted to channel water away from the tire, and thereby maintain rubber contact with the road, have been tried by the prior art to correct this problem. Although prior art rain tire designs have improved wet traction, it is a continuing goal in the art to further improve wet traction.

It is an object of the present invention to provide a pneumatic tire having improved wet traction while having good handling, improved noise and improved irregular wear characteristics.

Other objects of the invention will be apparent from the following description and claims.

DEFINITIONS

"Aqua Channel" refers to an extra wide circumferential groove with angled (non parallel), rounded groove walls designed specifically to channel water out of the footprint contact patch of the tire.

"Aspect Ratio" of the tire means the ratio of its section height to its section width.

"Bead" means that part of the tire comprising an annular tensile member wrapped by ply cords and shaped, with or without other reinforcement elements such as flippers, chippers, apexes, toe guards and chafers, to fit the design rim.

"Carcass" means the tire structure apart from the belt structure, tread, undertread, and sidewall rubber over the plies, but including the beads.

"Contact Patch" refers to a section of footprint, in a footprint that is divided into sections by wide void areas, that maintains contact with the ground.

"Crown" refers to the circumferentially outermost portion of the carcass substantially within the width limits of the tread.

"Directional tread" refers to a tread design which has a preferred direction of rotation in the forward direction of travel.

"Equatorial plane (EP)" means the plane perpendicular to the tire's axis of rotation and passing through the center of its tread.

"Footprint" means the contact patch or area of contact of the tire tread with a flat surface at zero speed and under design load and pressure.

"Footprint Net-to-gross" refers to the actual footprint of a deflected tire and is the ratio of the ground contacting surface area of the tread to the total tread footprint area including the groove void area.

"Groove" means an elongated void area in a tread that may extend circumferentially or laterally about the tread in a straight, curved, or zig-zag manner. Grooves ordinarily remain open in the tire footprint. Circumferentially and laterally extending grooves sometimes have common portions and may be subclassified as "wide" or "narrow" Grooves may be of varying depths in a tire. If such narrow or wide grooves are of substantially reduced depth as compared to wide circumferential grooves which they interconnect, they are regarded as forming "tie bars" tending to maintain a rib-like character in the tread region involved.

"Lugs" refer to discontinuous radial rows of tread rubber in direct contact with the road surface.

"Net-to-gross" refers to the ratio of the ground contacting surface of a tread to the total tread area.

"Normal load and inflation pressure" refers to the specific design inflation pressure and load assigned by the appropriate standards organization for the design rim and service condition for a tire of specific size. Examples of standards are the Tire and Rim Association Manual and the European Tire and Rim Technical Organization.

"Pneumatic tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load.

"Radial" and "radially" are used to mean directions radially toward or away from the axis of rotation of the tire.

"Rib" means a circumferentially extending strip of rubber on the tread which is defined by at least one circumferential "wide groove" and either a second such groove or a lateral edge of the tread, the strip of rubber being laterally undivided by full-depth narrow or wide grooves.

"Shoulder" refers to the upper portion of sidewall just below the tread edge.

"Sidewall" means that portion of a tire between the tread and the bead.

"Sipes" refer to small slots molded into ribs of a tire that subdivide the tread surface and improves traction characteristics. Sipes tend to close completely in a tire footprint.

"Slots" are elongated void areas formed by steel blades inserted into a cast or machined mold or tread ring. Slots ordinarily remain open in a tire footprint. In the appended drawings, slots are illustrated by single lines because they are so narrow.

"Tread" means a molded rubber component which, when bonded to a tire casing, includes that portion of the tire that comes into contact with the road when the tire is normally inflated and under normal load.

"Tread width" means the arc length of the road contacting tread surface in the axial direction, that is, in a plane parallel to the axis of rotation of the tire.

SUMMARY OF THE INVENTION

A pneumatic tire for use on paved surfaces is provided which comprises a pair of annular beads, carcass plies wrapped around the beads, a tread disposed over the carcass plies in a crown area of the tire, and sidewalls disposed between the tread and the beads. The tread is directional and has a net-to-gross ratio of 50% to 70% and two annular aqua channels each having a width of about 10% to 20% of total treadwidth based on the footprint of the tire. The aqua channels have a depth of 78% to 100% of the total tread depth. Shoulder lateral grooves, being defined as the lateral grooves between an aqua channel and a shoulder of the tire, are disposed having a first end in a leading part of the tread pattern nearer the aqua channel than a shoulder, and a second end in a trailing part of the tread pattern nearer a shoulder than an aqua channel. Center lateral grooves, being defined as lateral grooves between aqua channels, have a first portion in a leading part of the tread pattern closer to a center of the tire than to an aqua channel and a second portion in the trailing part of the tread pattern closer to an aqua channel than to the center of the tire.

Different illustrated embodiments of the tire have a circumferential groove at the equatorial plane (EP) of the tire or a rib at the EP of the tire.

Various combinations of skewing between the center lateral grooves and shoulder lateral grooves, and skewing between shoulder lateral grooves improve the noise, and possibly, the traction properties of the tire.

In one embodiment, the shoulder portions or lugs of the tire, bounded by lateral grooves, the shoulder and an aqua channel, comprise a single block element. In another embodiment, center tread portions or lugs, bounded by both aqua channels, comprise a single block element. Tires having various combinations of the above features are also provided.

The aqua channels have an extended U-shape where a wall of the aqua channel closer to a shoulder has a steeper incline than the side of the aqua channel closer to the center of the tire.

In a preferred embodiment, there is a step in the bottom of the aqua channel between the shoulder side and the center side. In the illustrated embodiment, the center side of the step is higher than the shoulder side by a distance d.

The center of the tire may be extended radially outward to induce more pressure on the center portion of the tire.

The aqua channel and the lateral grooves provide a means for expelling large volumes of water from the tire footprint contact patch.

DETAILED DESCRIPTION OF THE INVENTION

Figure 1:
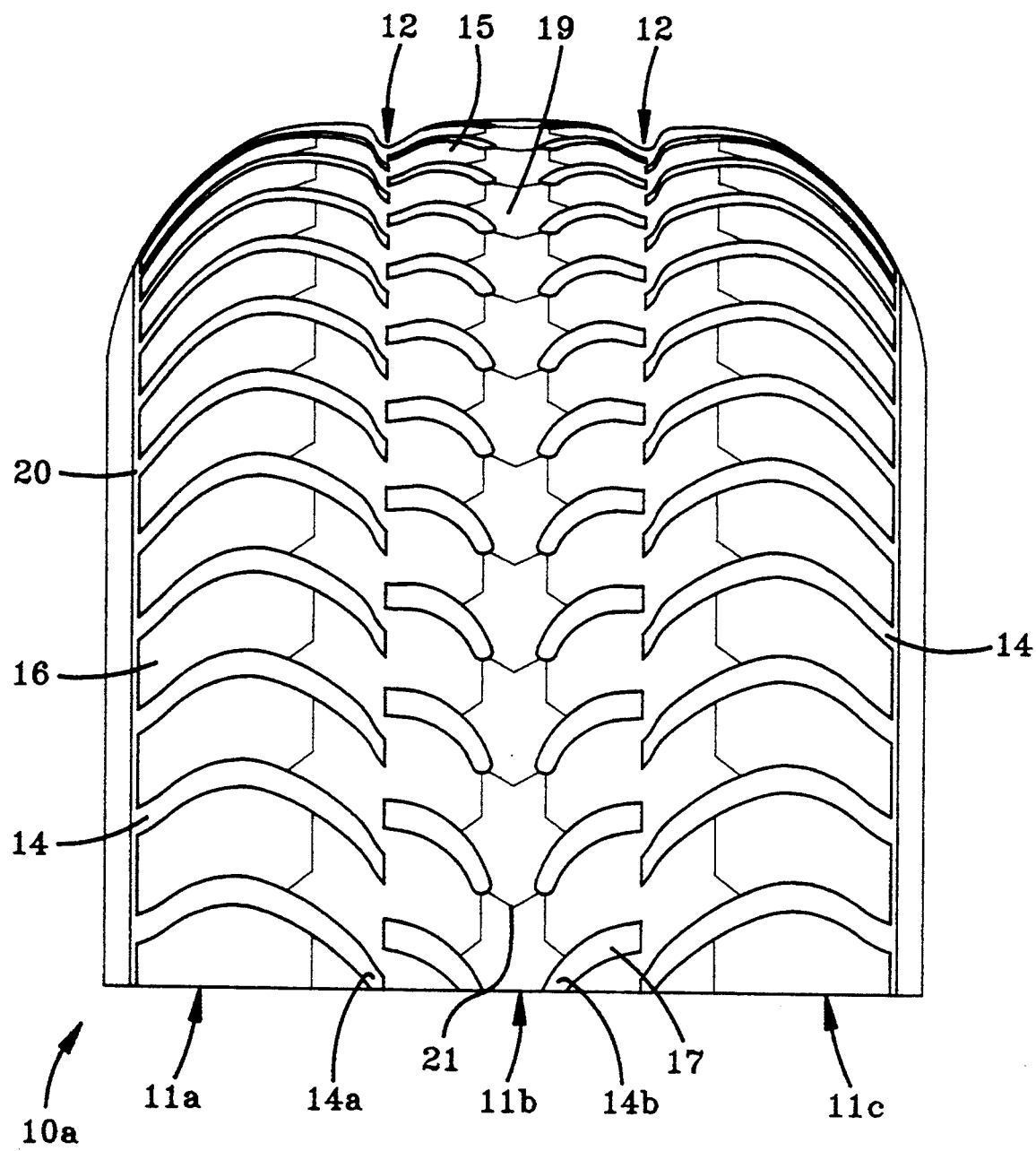
FIG. 1 is a frontal view of one embodiment of a tire of the invention.

With reference now to FIG. 1, tire 10a has a tread portion 11 which is divided into three circumferentially extending parts, 11a, 11b and 11c by aqua channels 12. Curved lateral grooves 14 initiate in aqua channels 12 and take an uninterrupted slanted or arcuate path to shoulder 20. Curved lateral grooves 17 (in center tread portion 11b) initiate in aqua channels 12 and end in center rib portion 19. The aqua channels 12 intersect lateral grooves 17 and 14, respectively, forming center lugs 15 and shoulder lugs 16.

When driving on wet roads, the presence of the lateral grooves in the aqua channel substantially facilitates the flow of water out of the contact patch of the tire footprint. Water not expelled through the shoulder passes through the aqua channels. This mechanism helps prevent water back pressure from building up in front of the tire, and helps maintain rubber contact between the tire and the pavement.

The tread of the tire of the invention is directional since, if the tire is mounted such that a portion 14a, 14b of the lateral groove in the center of the tire enters the footprint last, water would be channeled toward, instead of away from the center of the tire.

Figure 2:
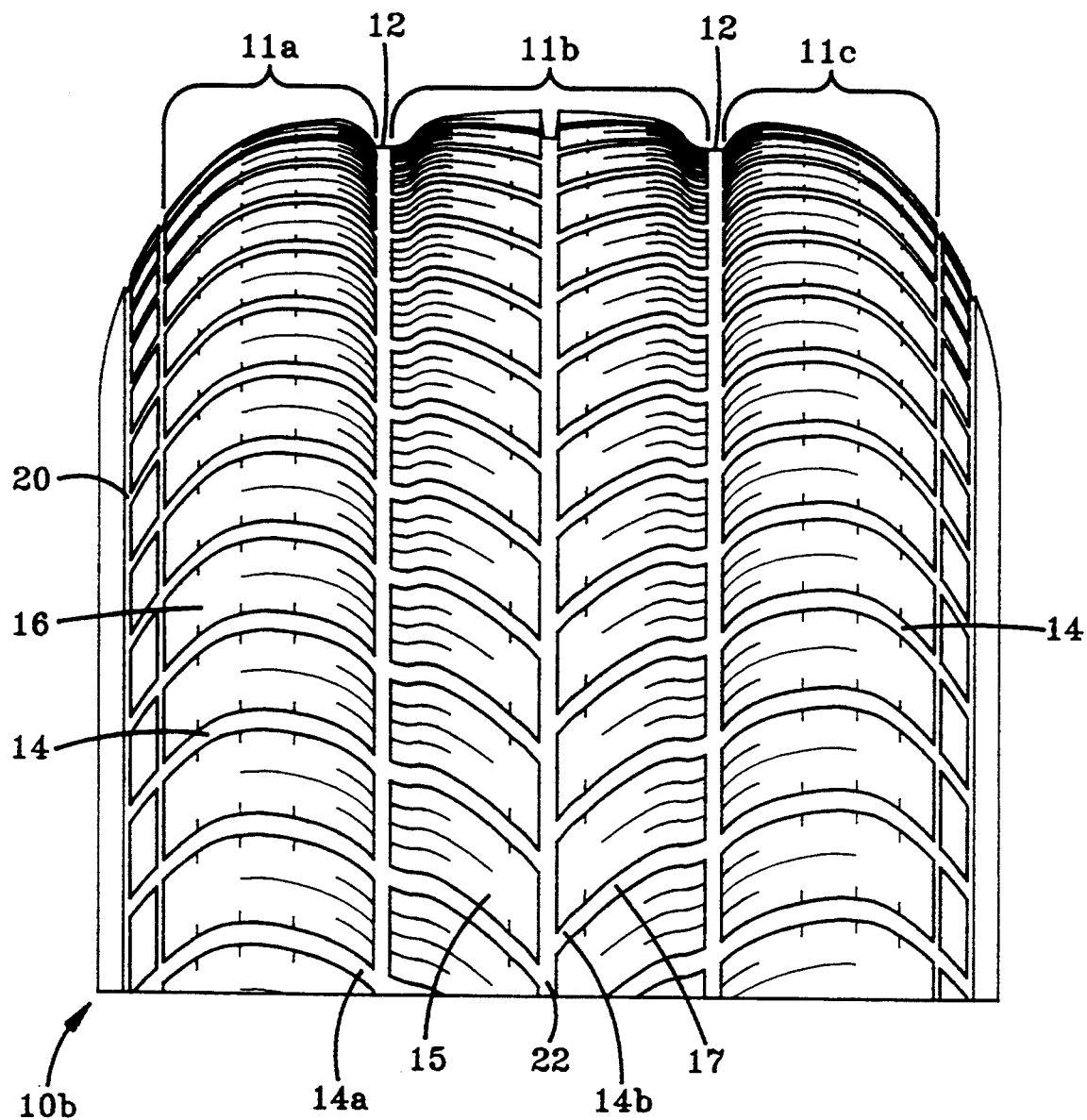
FIG. 2 is a frontal view of a second embodiment of a tire of the invention.

In an alternative embodiment, as illustrated in FIG. 2, a tire 10b of the invention may be made with a center groove 22.

A tire made with a center groove has the advantages that there is a decoupling between the portions of the tire on either side of the equatorial plane of the tire (groove) which may make the ride smoother when the tire passes over a stone. Also, a center groove helps dissipate heat. Also, designs providing for skewing between the two tread portions (in order to improve noise properties) are more easily facilitated if skewing takes place around a groove.

A tire with a center rib (FIG. 1) has the advantages that the tire, since most of the pressure is on the center of the tire, has a continuous, pressure bearing, locus of points in contact with the road. This reduces noise and causes a smoother ride on smooth pavement. When a tire with a center rib is provided, the rib will be bladed (21) to increase grip, reduce heat build up and to provide a pleasing design.

A pneumatic tire for use on paved surfaces of the invention comprises a pair of annular beads, carcass plies wrapped around the beads, a tread disposed over the carcass plies in a crown area of the tire, and sidewalls disposed between the tread and the beads. The tread is directional and has a net-to-gross ratio of 50% to 70% and two annular aqua channels each having a width of about 10% to 20% of total treadwidth based on the footprint of the tire. The aqua channels have a depth of 78% to 100% of the total tread depth. Shoulder lateral grooves, being defined as the lateral grooves between an aqua channel and a shoulder of the tire, are disposed having a first end in a leading part of the tread pattern nearer the aqua channel than a shoulder, and a second end in a trailing part of the tread pattern nearer a shoulder than an aqua channel. Center lateral grooves, being defined as lateral grooves between aqua channels, have a first portion in a leading part of the tread pattern closer to a center of the tire than to an aqua channel and a second portion in the trailing part of the tread pattern closer to an aqua channel than to the center of the tire.

In a preferred embodiment, the center lateral grooves 17 will have an angle of 25°–55°, preferably 35°–45° with respect to the EP of the tire. Shoulder lateral grooves 14 will have an angle of 60° to 110° with respect to the EP, preferably approaching 90° at the tread edge.

Various combinations of skewing between the center lateral grooves and shoulder lateral grooves, and skewing between shoulder lateral grooves improve the noise, and possibly, the traction properties of the tire.

In one embodiment, the shoulder portions or lugs of the tire, bounded by lateral grooves, the shoulder and an aqua channel, comprise a single block element. In another embodiment, center tread portions or lugs, bounded by both aqua channels, comprise a single block element. Tires having various combinations of the above features are also provided.

In the preferred embodiment, the tires of the invention are siped to improve traction and increase the flexibility of the tread. Tread block sipes are preferably parallel to lateral grooves. The siping in the shoulder of the tire extends slightly beyond the tread edge. The sipes are bladed, in the shoulder, so that short sipes become longer as the tire wears. That is, the sipes are bladed wider under the surface of the tread block.

The aqua channels have an extended U-shape where a wall of the aqua channel closer to a shoulder has a steeper incline than the side of the aqua channel closer to the center of the tire.

Figure 3:
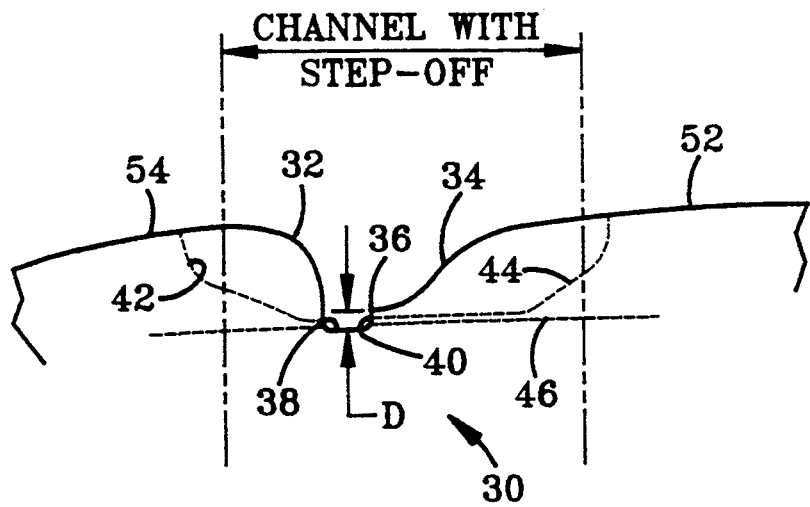
FIG. 3 illustrates a cross section of an aqua channel of the tire.

With reference now to FIG. 3, the aqua channels have a small center groove 38 without siping. Using the bottom D of the center groove as a reference point, the dimensions (d) in the illustrated tire, relative thereto, can be represented as d=1.5 mm for the treadwear indicators, and d=0.6 mm to 1 mm, preferably 0.8 mm for step-off 36. Siping (the bottom of the sipe 40) near the aqua channel is at d=0.5 mm. Accordingly, the aqua channel and siping remain when the tire is worn down to the tread depth indicators. Those skilled in the art will recognize that the specific dimensions will depend on the laws of the specific country in which the tires are sold, and the size of the tire.

The bottom 46 of the lateral grooves is at about the same level as bottom 38 of the aqua channel.

Figure 4:
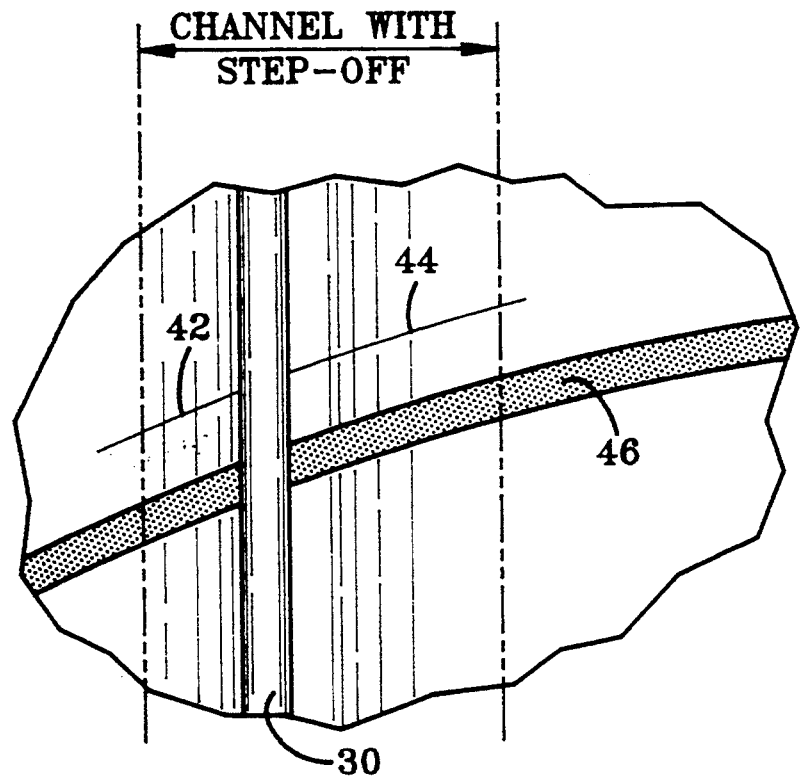
FIG. 4 illustrates a top view of a portion of an aqua channel of the tire.

As can be seen in FIGS. 3 and 4, the profile of the blade depth 44 in the rubber block (near the aqua channel is full depth 40 for half of the block length and then takes the profile shown in the drawings. Blade depth 42 shows a slight incline toward the shoulder of the tire in the profile shown. The ratio of (sipe length)/(sipe length+unsiped block length) is relatively constant over most of the life of the tire. It is believed that these features help maintain traction properties relatively constant over the life of the tire.

The width of the aqua channel at the tread surface is about 2-5 cm, depending on the size of the tire. For instance, a size 175-70 tire has an aqua channel width of 2 cm, and a 235/50 size tire has an aqua channel width of 5 cm.

Figure 5:
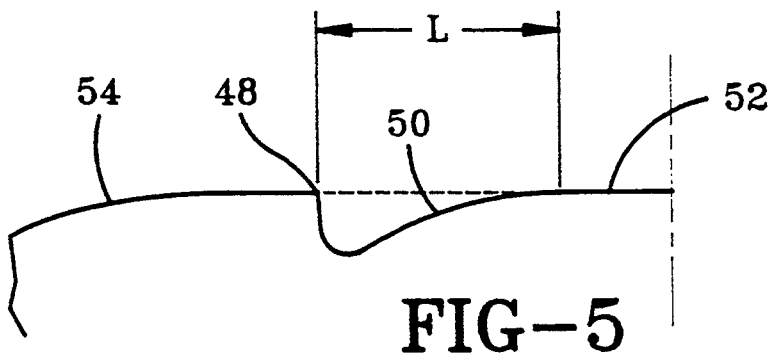
FIG. 5 illustrates an alternative aqua channel of the tire.
Figure 7:
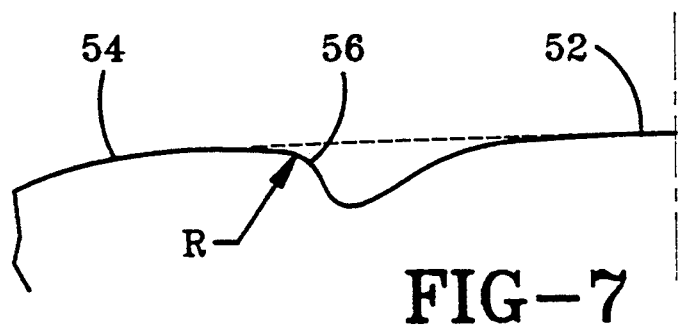
FIG. 7 illustrates an alternative aqua channel having radiused walls.
Figure 8:
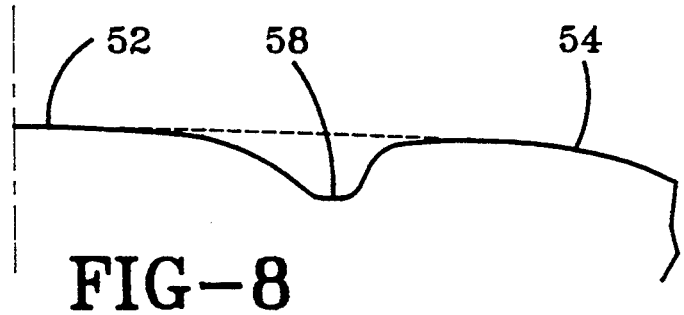
FIG. 8 illustrates an alternative aqua channel having a flattened bottom.

As discussed above, shoulder wall 32 of the aqua channel 12 has a steeper incline than center wall 34. Center wall 34 has an inflection point at about 35% to 70%, preferably 50%, of the tread depth of the tire. The position of the inflection point has an influence on the profile of the aqua channel FIGS. 5–8 illustrate alternative profiles for the shape of an aqua channel. In these Figures, it is also seen that the aqua channel may be provided without a step off. The shoulder lug 54 and the center lug 52 may have a variety of shapes relative to aqua channel 12. For example, FIG. 5 shows a sharp lug edge 48 on lug 54 and a convex shaped channel wall 50 leading into lug 52. FIG. 7 shows a radius 56 on lug 54 and FIG. 8 shows an aqua channel with sharp corners at bottom 58.

Figure 6:
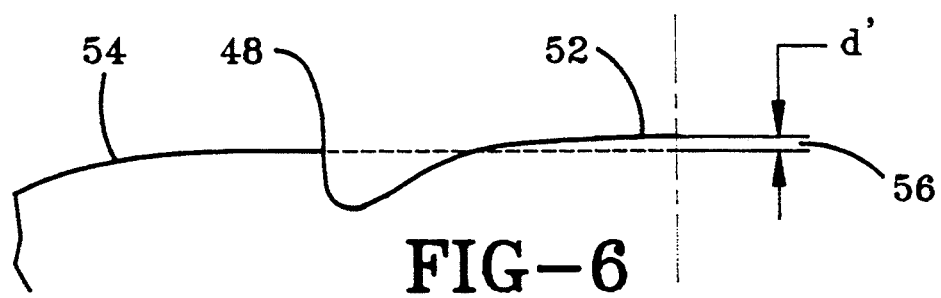
FIG. 6 illustrates a third embodiment of the tire showing an extended center portion.

In FIG. 6, lug 54 has a sharp corner 48 but has a center lug 52 which is radially extended in the shape of the tire and the added pressure in the center of the footprint of the tire improves rolling resistance while maintaining traction properties.

The tread has a designed total net-to-gross ratio of 45% to 70%, preferably 45% to 60%. In the part of the tread that touches the road (the contact patch) (i.e. the footprint excluding the aqua channels), the tread has a net-to-gross ratio of about 60% to 90%, preferably 68% to 80% and in the illustrated embodiments about 73%. In the illustrated embodiment the overall design net-to-gross ratio is about 55%. It is believed that the high traction properties of the tire, even when the overall net to gross is very low, is partially attributable to the fact that there is a large amount of rubber in contact with the road in the portions of the tire that contact the road.

In a tire footprint under design load and pressure, the width of the aqua channel is 10%-20%, preferably about 15%, and the overall footprint net to gross is about 50% to 70%, preferably about 55 to 65%. In the illustrated embodiment the footprint net to gross is about 60%. In the contact patch, the part of the tire that touches the road (the footprint excluding the aqua channel), the net-to-gross is about 60%-80% preferably 65% to 75%. In the illustrated embodiment the contact patch net-to-gross is about 70%.

The depth of the aqua channel may comprise 78% to 100%, preferably 82% to 92% of the total tread depth which is about 0.91 cm (0.36 in). By total tread depth it is meant the distance from the tread base to the land area of a lug. In the illustrated embodiment the aqua channel depth is about 83% of the total tread depth or about 0.13 cm (0.05 in) less than the total depth. The extended U-(rounded) shape of the channel provides for smooth flow of water into the channel and out of the contact patch of the tire footprint and for improved lateral traction in the tire.

Also, the curvature of the shoulder walls of the extended U of the channel is similar to the curvature of the shoulder of the tire and in effect, provides a second shoulder for gripping the road and providing improved lateral control and handling properties.

While specific embodiments of the invention have been illustrated and described, it will be recognized by those skilled in the art that the invention may be variously modified and practiced without departing from the spirit of the invention. The invention is limited only by the following claims.

What is claimed is:

1. A pneumatic tire for use on paved surfaces comprising a pair of annular beads, carcass plies wrapped around said annular beads, a tread disposed over said carcass plies in a crown area of said tire, and sidewalls disposed between said tread and said beads wherein said tread is directional and has a footprint net-to-gross ratio of 50% to 70% and two annular aqua channels each having a width of about 10% to 20% of total treadwidth based on the footprint of the tire and a depth of 78% to 100% of total tread depth, and wherein shoulder lateral grooves between an aqua channel and a shoulder are disposed having a first end in a leading part of the tread pattern nearer the aqua channel than a shoulder and a second end in a part of the tread pattern nearer a shoulder than an aqua channel, and wherein center lateral groves between aqua channels have a first portion in the leading part of the tread pattern closer to a center of the tire than to an aqua channel and a second portion in the part of the tread pattern closer to an aqua channel than to the center of the tire, and wherein the center of said tire comprises a rib and said aqua channels have an extended U-shape wherein one wall of the aqua channel has a steeper incline than the opposite side of the aqua channel.

2. The tire of claim 1 wherein center tread portions bounded by both aqua channels and lateral grooves comprise a single block element.

3. The pneumatic tire of claim 1 wherein each aqua channel has a step between a shoulder side and a center side of said aqua channel wherein the center side is higher than the shoulder side by a distance d.

4. The pneumatic tire of claim 3 in which the center of said tire is extended radially outward over the normal shape of the tire to induce more pressure on center ribs of said tire in use.

5. The pneumatic tire of claim 4 in which said tire center has extra thickness in the tread gauge to extend said center radially outward.

6. The pneumatic tire of claim 1 wherein one wall of the aqua channel closer to a shoulder of the tire has a steeper incline than the side of the aqua channel closer to the center of the tire.

* * * * *